(12) United States Patent
Slesinski et al.

(10) Patent No.: US 6,976,816 B2
(45) Date of Patent: Dec. 20, 2005

(54) COMBINATION LOCK WASHER AND SPINDLE BEARING ASSEMBLY

(75) Inventors: Steve Slesinski, Kalamazoo, MI (US); Jeff Moreau, Lawton, MI (US); Dave Moses, Kalamazoo, MI (US); Tom Lyon, Lawton, MI (US)

(73) Assignee: Dana Corporation, Toledo, OH (US)

( * ) Notice: Subject to any disclaimer, the term of this patent is extended or adjusted under 35 U.S.C. 154(b) by 43 days.

(21) Appl. No.: 10/632,443

(22) Filed: Aug. 1, 2003

(65) Prior Publication Data

US 2005/0025604 A1 Feb. 3, 2005

(51) Int. Cl.$^7$ ............................................... F16B 39/10
(52) U.S. Cl. ..................... 411/122; 411/120; 411/197
(58) Field of Search ....................... 411/119–125, 201, 411/204, 220, 197, 975–977, 226, 233–237, 223, 539, 965, 969, 533, 541

(56) References Cited

U.S. PATENT DOCUMENTS

| | | | | |
|---|---|---|---|---|
| 130,689 | A | * 8/1872 | Ball | 411/201 |
| 433,730 | A | * 8/1890 | Harker | 411/190 |
| 474,315 | A | * 5/1892 | Duer | 411/124 |
| 480,667 | A | 8/1892 | Miller | |
| 489,595 | A | 1/1893 | Sutton | |
| 641,191 | A | * 1/1900 | Champion | 411/402 |
| 706,409 | A | * 8/1902 | Hart | 411/124 |
| 739,716 | A | * 9/1903 | Reid | 411/236 |
| 782,418 | A | 2/1905 | Rogers | |
| 906,475 | A | * 12/1908 | Ullman | 411/197 |
| 955,577 | A | * 4/1910 | Bradshaw | 411/123 |
| 1,015,763 | A | * 1/1912 | Ploncard | 411/120 |
| 1,320,962 | A | * 11/1919 | Andrix | 411/201 |
| 1,372,178 | A | * 3/1921 | Loving | 411/131 |
| 1,505,431 | A | 8/1924 | Rollins | |
| 1,543,282 | A | * 6/1925 | De Loe | 411/197 |
| 1,685,120 | A | * 9/1928 | Carns | 411/201 |
| 1,731,337 | A | * 10/1929 | Giovannini | 411/120 |

(Continued)

FOREIGN PATENT DOCUMENTS

| | | |
|---|---|---|
| DE | 32 32 150 A | 3/1984 |
| EP | 1 070 603 A | 1/2001 |
| FR | 539 855 A | 7/1922 |
| GB | 778 607 A | 7/1957 |

OTHER PUBLICATIONS

Search Report issued in PCT Application No. PCT/US2004/022538 dated Nov. 18, 2004.
Written Opinion issued in PCT Application No. PCT/US2004/025538 dated Nov. 18, 2004.

*Primary Examiner*—J J Swann
*Assistant Examiner*—Jeffrey A. Sharp
(74) *Attorney, Agent, or Firm*—Dykema Gossett PLLC

(57) ABSTRACT

The present invention relates to a connection between a spindle and a bearing assembly to retain the bearing assembly on the spindle. A combination lock washer and spindle bearing assembly is provided to include a spindle, thrust washer, lock washer and nut in which the lock washer simultaneously locks the inner thrust washer and an outer spindle nut. According to the present invention, the thrust washer, lock washer and nut may be oriented at any angle relative to one another allowing for infinite bearing adjustment positions.

15 Claims, 5 Drawing Sheets

U.S. PATENT DOCUMENTS

| | | | | |
|---|---|---|---|---|
| 1,966,015 A | * | 7/1934 | Kuzovenkoff | 411/234 |
| 2,128,429 A | * | 8/1938 | Olson | 411/123 |
| 2,155,827 A | * | 4/1939 | Herold | 16/38 |
| 2,887,891 A | * | 5/1959 | Perez | 474/171 |
| 2,955,885 A | | 10/1960 | Storch | |
| 3,294,141 A | * | 12/1966 | Schotthoefer et al. | 411/222 |
| 3,307,893 A | * | 3/1967 | Williams | 384/585 |
| 3,447,342 A | * | 6/1969 | Hein | 464/23 |
| 3,851,690 A | * | 12/1974 | Wing et al. | 411/190 |
| 4,326,816 A | * | 4/1982 | Morisawa | 403/228 |
| 4,505,628 A | * | 3/1985 | Meibuhr | 411/123 |
| 4,737,058 A | * | 4/1988 | Callman et al. | 411/120 |
| 4,812,094 A | * | 3/1989 | Grube | 411/134 |
| 5,022,875 A | * | 6/1991 | Karls | 440/49 |
| 5,221,168 A | * | 6/1993 | Kasai | 411/124 |
| 5,618,143 A | * | 4/1997 | Cronin et al. | 411/220 |
| 5,674,034 A | * | 10/1997 | Bennett | 411/197 |
| 5,772,373 A | * | 6/1998 | Cronin et al. | 411/120 |
| 5,938,173 A | * | 8/1999 | Hayakawa | 251/214 |
| 5,967,723 A | * | 10/1999 | Duran | 411/121 |
| 6,010,290 A | | 1/2000 | Slesinski et al. | |
| 6,095,735 A | * | 8/2000 | Weinstein et al. | 411/221 |
| 2003/0035699 A1 | * | 2/2003 | Harris | 411/161 |

* cited by examiner

COMBINATION LOCK WASHER AND SPINDLE BEARING ASSEMBLY

BACKGROUND OF THE INVENTION

1. Field of the Invention

The present invention relates to a vehicle wheel end system, and more particularly, to the connection between a spindle and a spindle bearing including a lock washer to simultaneously lock an inner thrust washer and an outer spindle nut.

2. Discussion of Related Art

Generic lock washers are known in the art. Some lock washers have an inwardly extending tang to engage a groove in a shaft to which the washer is mounted. Other washers have tabs to engage a nut to prevent rotation. Still other washers have a longitudinally extending pin to engage a recess in an adjacent nut to prevent rotation. However, these designs may provide for limited adjustment positions, may not permit assembly of multiple components with standard socket installation sizes, may be time consuming to install, or may have a keyway in the thread providing for lower thread torque limitations. None of the prior art lock washers or lock washer assemblies comprise the unique arrangement of the present invention.

The inventors herein have recognized a need for a connection between a spindle and a hub assembly that will overcome the above-identified deficiencies.

SUMMARY OF THE INVENTION

An apparatus in accordance with the present invention provides for a combination lock washer and spindle bearing assembly. The combination lock washer and spindle bearing assembly is provided to include a spindle, thrust washer, lock washer and nut, the lock washer simultaneously locks an inner thrust washer and an outer spindle nut. The thrust washer, lock washer and nut may be oriented at any angle relative to one another allowing for infinite adjustment positions. The spindle includes a spindle shoulder and a spindle end extending outward from the spindle shoulder with an uninterrupted thread configuration. The thrust washer is disposed about the spindle shoulder and has at least one outer retaining feature. The nut is disposed about the uninterrupted thread configuration and includes a nut body with at least one nut retaining feature and an inner circumferential shoulder extending from the nut body in direct contact with the thrust washer forming a pocket between the thrust washer and nut body. The lock washer is disposed about the inner circumferential shoulder and is retained within the pocket between the thrust washer and nut body. The lock washer further has at least one washer extension corresponding to and engaging each outer retaining feature of the thrust washer, and at least one nut extension corresponding to and engaging each nut retaining feature of the nut.

These and other features and objects of this invention will become apparent to one skilled in the art from the following detailed description and the accompanying drawings illustrating features of this invention by way of example.

DETAILED DESCRIPTION OF EMBODIMENTS OF THE INVENTION

Figure 1:
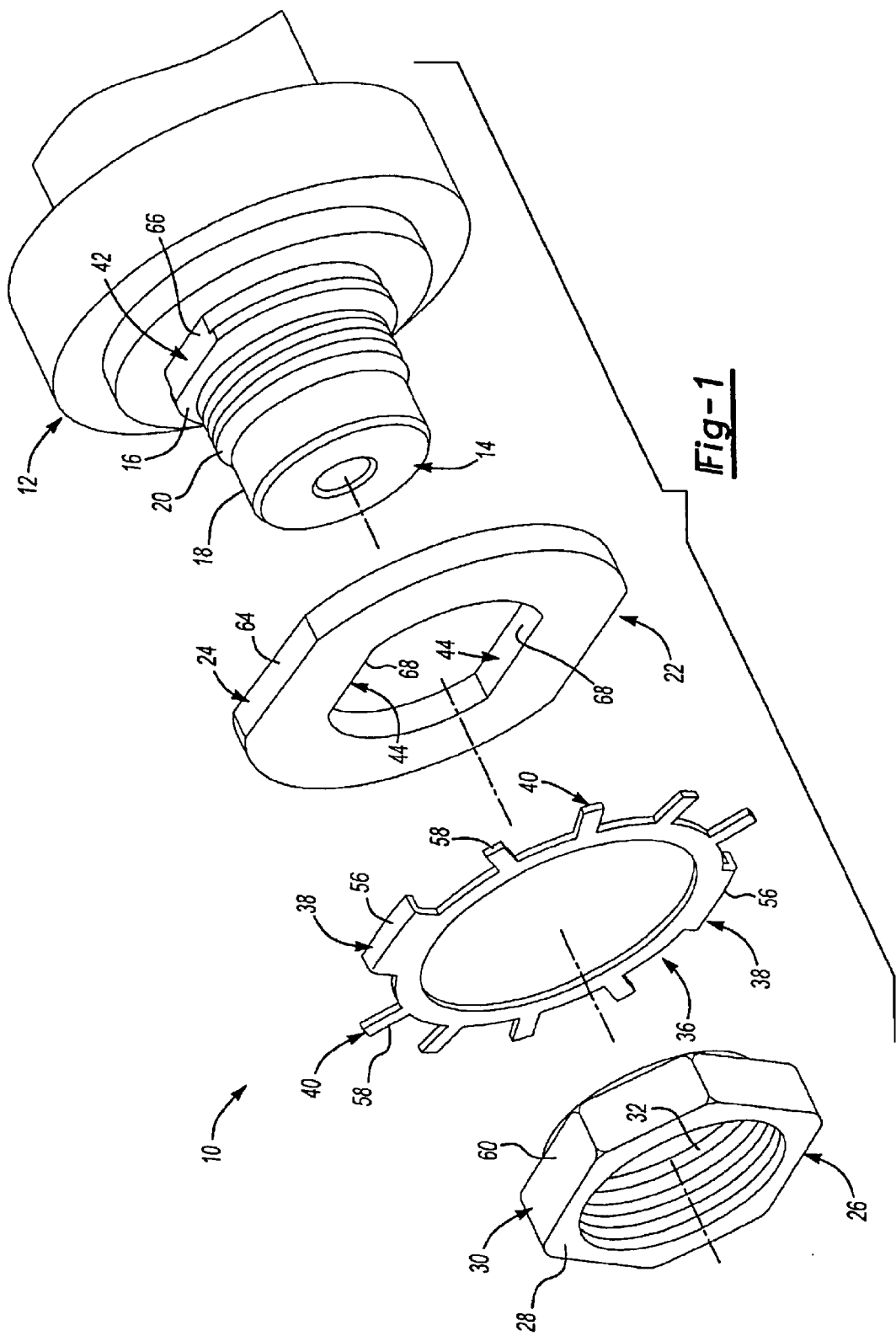
FIG. 1 is an exploded perspective view of a portion of a vehicle incorporating one embodiment of the present invention.
Figure 4:
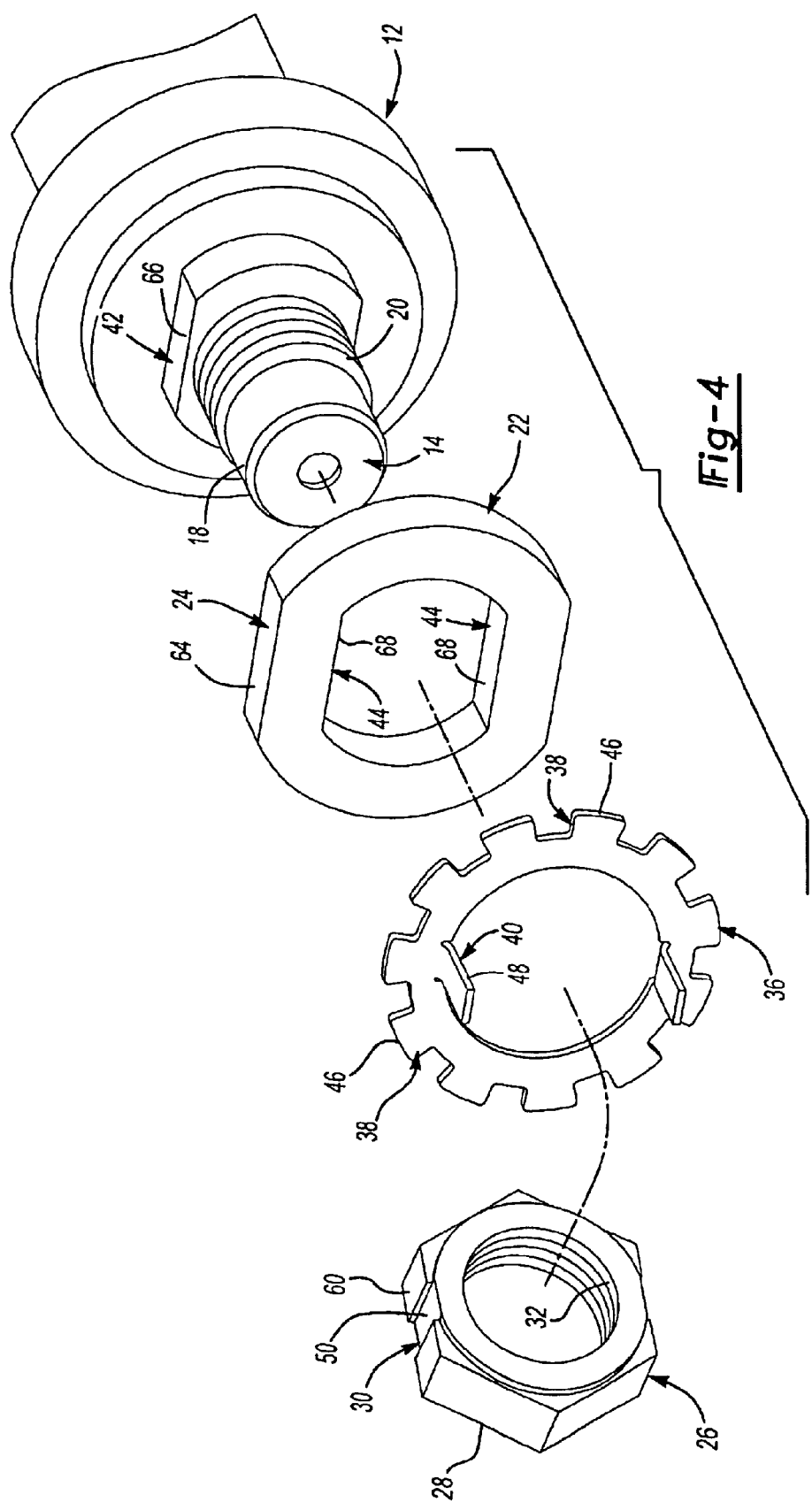
FIG. 4 is an exploded perspective view of a portion of a vehicle incorporating one embodiment of the present invention.

Referring now to the drawings wherein like reference numerals are used to identify identical components in the various views, FIGS. 1 and 4 illustrate a portion of a vehicle having a combination lock washer and spindle bearing assembly 10 in accordance with various embodiments of the present invention. A combination lock washer and spindle bearing assembly 10 is provided to include a spindle 12, thrust washer 22, lock washer 36 and nut 26 which may be oriented at any angle relative to one another allowing for infinite adjustment positions, at the same time the lock washer 36 of the present invention prevents relative rotation between the spindle 12, thrust washer 22, lock washer 36, and nut 26.

An embodiment of the present invention provides a spindle 12 including a spindle shoulder 16 and a spindle end 18 extending outward from the spindle shoulder 16 with an uninterrupted thread configuration 20. The thrust washer 22 is disposed about the spindle shoulder 16 and has at least one outer retaining feature 24. The nut 26 is disposed about the uninterrupted thread configuration 20 and includes a nut body 28 with at least one nut retaining feature 30 and an inner circumferential shoulder 32 extending from the nut body 28 in direct contact with the thrust washer 22 forming a pocket 34 between the thrust washer 22 and nut body 28. The lock washer 36 is disposed about the inner circumferential shoulder 32 and is retained within the pocket 34 between the thrust washer 22 and nut body 28. The lock washer 36 further has at least one washer extension 38 corresponding to and engaging each outer retaining feature 24 of the thrust washer 22, and at least one nut extension 40 corresponding to and engaging each nut retaining feature 30 of the nut 26. The thrust washer 22, lock washer 36, and nut 26 may be at any angle relative to one another allowing for infinite adjustment positions and the lock washer 36 prevents relative rotation between the spindle 12, thrust washer 22, lock washer 36, and nut 26.

Figure 3:
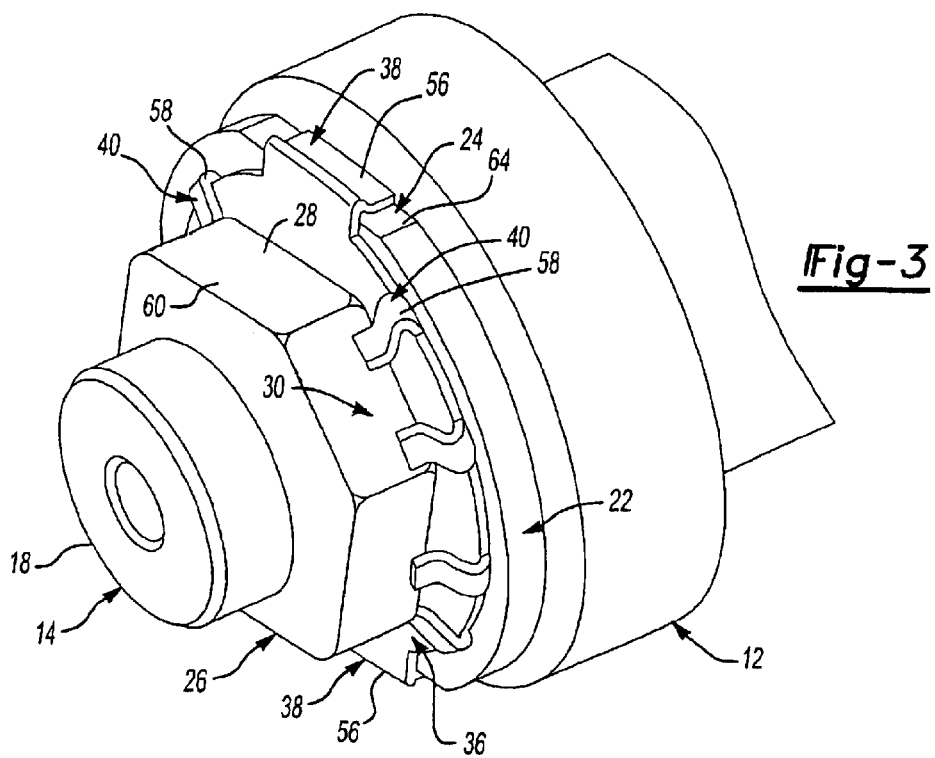
FIG. 3 is a perspective view of one embodiment of the invention.

FIG. 3 provides an embodiment of a lock nut 26 according to the present invention in which at least one washer extension 38 comprises at least one washer tang 56 corresponding to and engaging each outer retaining feature 24 of the thrust washer 22. And, the at least one nut extension 40 comprises at least one nut tab 58 corresponding to and engaging each nut retaining feature 30. According to one embodiment, the nut tab 58 is bent into engagement with the nut retaining feature 30.

According to one embodiment of the present invention, the outer retaining feature 24 of the thrust washer 22 is a flat outer edge 64. The flat outer edge 64 is suitable for receiving the washer tang 48 as shown in FIGS. 1–3.

FIG. 3 illustrates an embodiment in which the nut retaining feature 30 is a flat surface 60 of the nut 26 suitable for receiving the washer tab 46.

Figure 2:
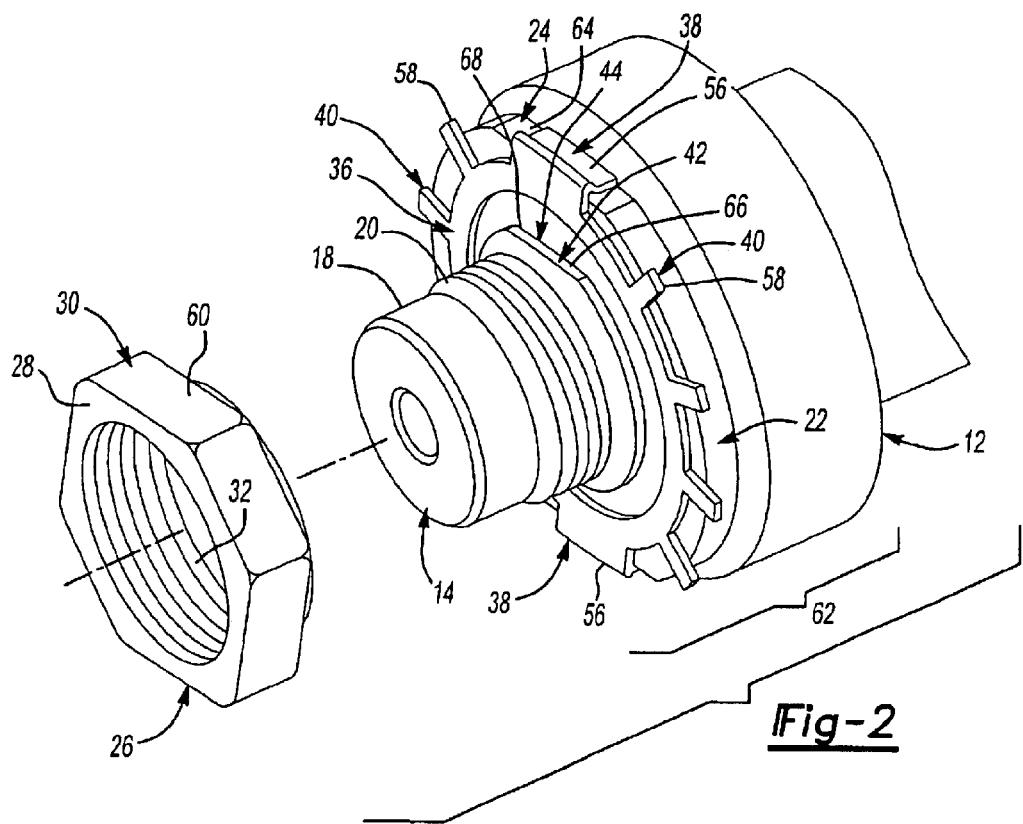
FIG. 2 is a partially exploded perspective view of one embodiment of the present invention.

FIG. 2 illustrates an embodiment of a lock washer 36 and thrust washer 22 according to the present invention in which the lock washer 36 and thrust washer 22 are engaged as a washer sub-assembly 62. According to one embodiment, opposing washer tangs 56 each include a raised portion creating a pocket that retains the thrust washer 22 relative to the lock washer 36.

Figure 6:
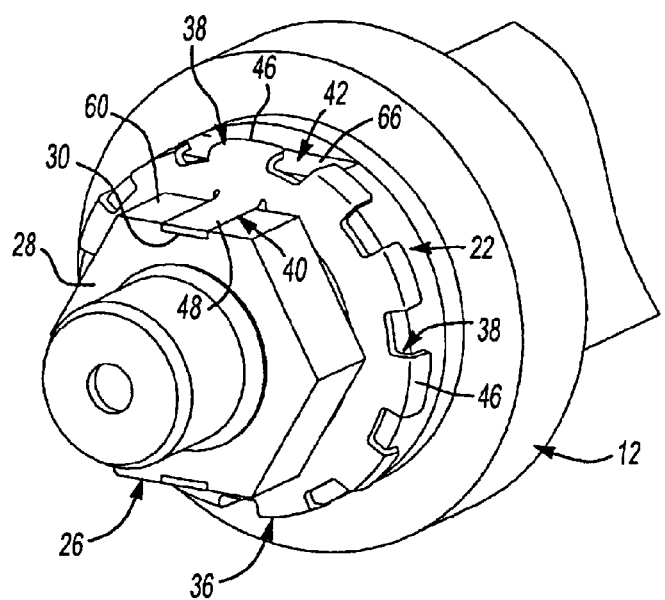
FIG. 6 is a perspective view of one embodiment of the invention.

FIG. 6 illustrates an embodiment in which the at least one washer extension 38 comprises at least one washer tab 46 corresponding to each outer retaining feature 24 of the thrust washer 22. The washer tab 46 is bent into engagement with each outer retaining feature 24. Additional washer tabs 46 may be provided to engage surrounding portions of the thrust washer 22. In addition, the at least one nut extension 40 comprises at least one nut tang 48 that corresponds to each nut retaining feature 30. Each nut tang 48 snaps into engagement with each nut retaining feature 30.

FIGS. 4–7 illustrate an embodiment of the nut 26 and lock washer 36 in which each nut retaining feature 30 comprises an outer groove 50 and each nut tang 48 is received in the outer groove 50. According to one embodiment, each nut retaining feature 30 and nut tang 48 are configured to fit within a standard installation socket such as would be found on a torque wrench.

Figure 5:
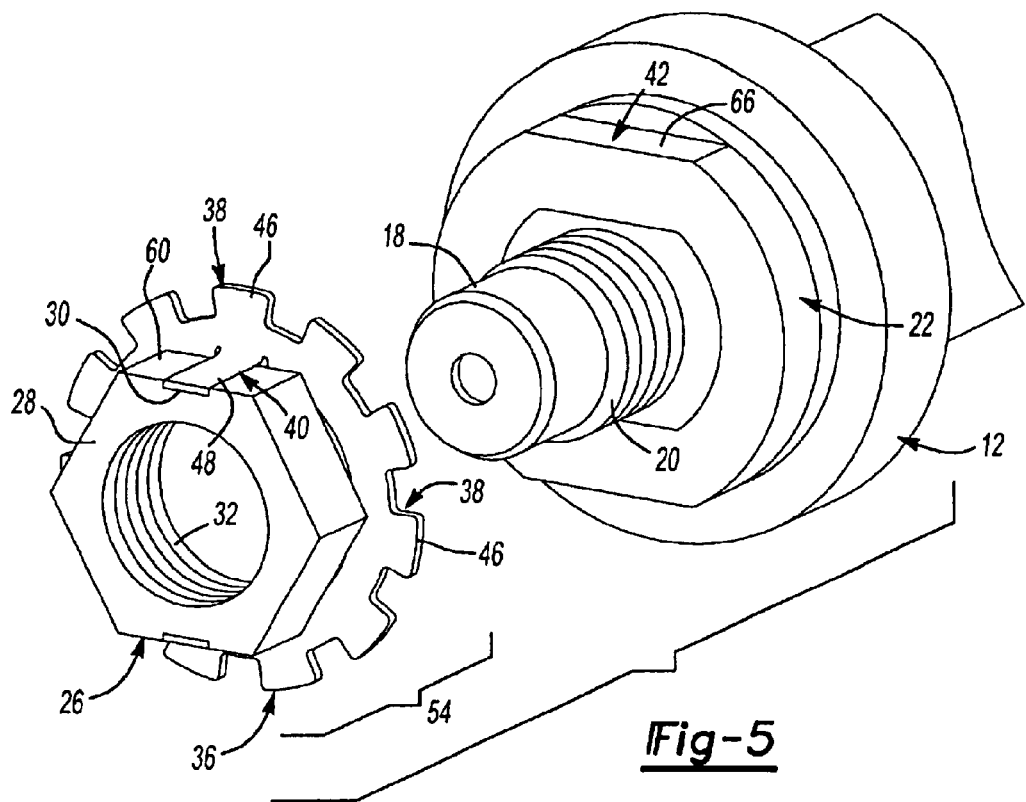
FIG. 5 is a partially exploded view of one embodiment of the present invention.

FIG. 5 provides an embodiment in which the nut tang 48 snaps into the outer groove 50 to retain the lock washer 36 relative to the nut 26. According to one embodiment, the lock washer 36 and nut 26 are sufficiently engaged to be provided as a sub-assembly 54.

According to one embodiment of the present invention, the outer retaining feature 24 of the thrust washer 22 is a flat outer edge 64. According to one embodiment, the flat outer edge 64 is suitable for receiving the washer tab 46 as shown in FIGS. 6 and 7.

Figure 7:
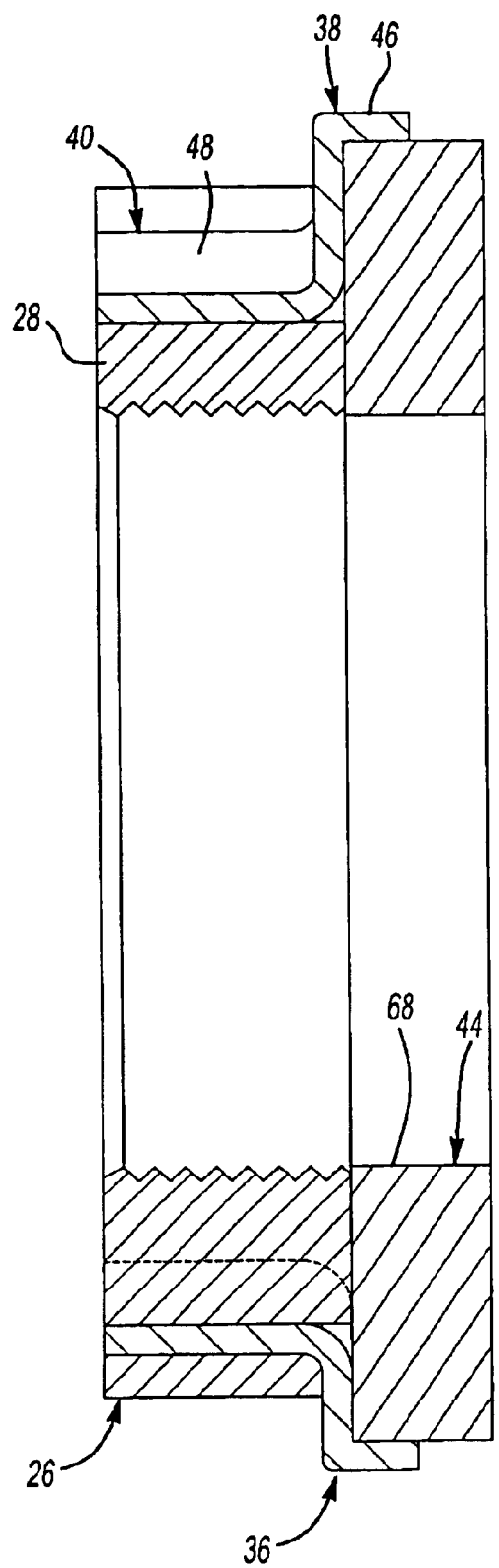
FIG. 7 is a cross sectional side view of one embodiment of the invention.

FIG. 7 illustrates an embodiment of a combination thrust washer 22, lock washer 36 and nut 26 assembly according to the present invention. The thrust washer 22 includes at least one outer retaining feature 24. The nut 26 is disposed adjacent the thrust washer 22. The nut 26 includes a nut body 28 with at least one nut retaining feature 30. The nut 26 further includes an inner circumferential shoulder 32 extending from the nut body 28 in direct contact with the thrust washer 22 forming a pocket 34 between the thrust washer 22 and nut body 28. The lock washer 36 is disposed about the inner circumferential shoulder 32 and is retained within the pocket 34 between the thrust washer 22 and nut body 28. The lock washer 36 further includes at least one washer extension 38 feature corresponding to and engaging each outer retaining feature 24 of the thrust washer 22, and at least one nut extension 40 feature corresponding to and engaging each nut retaining feature 30 of the nut 26. The combination thrust washer 22, lock washer 36 and nut 26 assembly is suitable for preventing relative movement between the thrust washer 22, lock washer 36, and nut 26.

FIG. 7 provides an embodiment of a lock washer 36 in which the lock washer 36 is provided to include at least one washer tab 46 suitable for bending into engagement with an adjacent thrust washer 22 outer retaining feature 24 to prevent relative rotation between the lock washer 36 and thrust washer 22, at least one nut tang 48 suitable for engaging an adjacent nut retaining feature 30 to prevent relative rotation between the lock washer 36 and nut 26. According to one embodiment, the at least one washer tab 46 includes a plurality of washer tabs 46 extending from the outer diameter of the lock washer 36, and the at least one nut tang 48 includes a plurality of nut tangs 48 extending from the inner diameter of the lock washer 36.

According to one embodiment, the lock washer 36 is stamped from steel. Torque is transmitted directly from the nut 26 to the thrust washer 22, as a result the lock washer 36 need not transmit thrust between the nut 26 and thrust washer 22, allowing the lock washer 36 to be made of relatively soft material such as a soft steel. In the alternative, the lock washer 36 may be formed of stamped steel with a hardened washer face, while the material forming the washer extension 38 and material forming the nut extension 40 remain suitably ductile for forming into respective final shapes. The bearing assembly 12, spindle 12, thrust washer 22, and nut 26 may be made of materials known in the art.

According to one embodiment, the combination lock washer and spindle bearing assembly 10 includes a spindle shoulder 16 having at least one spindle retaining feature 42 and the thrust washer 22 has at least one inner retaining feature 44 corresponding to and mating with each spindle retaining feature 42. According to one embodiment, the spindle retaining feature 42 is a flat spindle surface 66 and the inner retaining feature 44 is a flat inner edge 68. According to another embodiment, the inner retaining feature 44 of the thrust washer 22 is a keyway shape, as may be known in the art, and the spindle retaining feature 42 is a shape corresponding to and mating with the keyway shape of the thrust washer 22. According to yet another embodiment, the spindle retaining feature 42 includes longitudinal splines, as may be known in the art, and the thrust washer 22 includes teeth corresponding to and mating with the longitudinal splines of the spindle 12.

A combination lock washer and spindle bearing assembly 10 in accordance with the present invention is advantageous compared to conventional methods of securing a bearing assembly 12 to a spindle 12. The locking assembly including the thrust washer 22, lock washer 36, and nut 26 assembly of the present invention allows for infinite adjustment positions in securing a bearing assembly to a spindle 12. The lock washer 36 of the present invention simultaneously secures the thrust washer 22 and nut 26 to prevent relative rotation between the spindle 12, thrust washer 22, lock washer 36 and nut 26. Further, the lock washer 36 and spindle 14 bearing assembly 12 provide for a spindle 14 with uninterrupted threaded configuration 20, increasing the strength and clamp load capacity of the lock washer 36 and spindle 14.

While the invention has been particularly shown and described with reference to the preferred embodiments thereof, it is well known by those skilled in the art that various changes and modifications can be made in the invention without departing from the spirit and scope of the invention.

What is claimed is:

1. A combination thrust washer, lock washer and nut assembly, comprising:
   a thrust washer having at least one outer retaining feature;
   a nut disposed adjacent the thrust washer, having:
   a nut body with at least one nut retaining feature; and
   an inner circumferential shoulder extending from the nut body in direct contact with the thrust washer forming a pocket between the thrust washer and nut body; and
   a lock washer disposed about the inner circumferential shoulder and retained within the pocket between the thrust washer and nut body, and having:
   at least one washer tab corresponding to and engaging each outer retaining feature, and
   at least one nut tang corresponding to and engaging each nut retaining feature; and wherein the lock washer is suitable for preventing relative movement between the thrust washer, lock washer, and nut.

2. A combination lock washer and spindle bearing assembly, comprising:
- a spindle having:
  - a spindle shoulder; and
  - a spindle end extending outward from the spindle shoulder with an uninterrupted thread configuration;
- a thrust washer disposed about the spindle shoulder and having at least one outer retaining feature;
- a nut disposed about the uninterrupted thread configuration, having:
- a nut body with at least one nut retaining feature; and
- an inner circumferential shoulder extending from the nut body in direct contact with the thrust washer forming a pocket between the thrust washer and nut body; and
- a lock washer disposed about the inner circumferential shoulder and retained within the pocket between the thrust washer and nut body, and having:
- at least one washer extension corresponding to and engaging each outer retaining feature of the thrust washer, and
- at least one nut extension corresponding to and engaging each nut retaining feature of the nut; and
- wherein the thrust washer, lock washer, and nut may be at any angle relative to one another allowing for infinite adjustment positions and the lock washer prevents relative rotation between the spindle, thrust washer, lock washer, and nut.

3. The assembly of claim 2 wherein:
the at least one washer extension comprises at least one washer tang corresponding to and engaging each outer retaining feature of the thrust washer, and
the at least one nut extension comprises at least one nut tab corresponding to and engaging each nut retaining feature.

4. The assembly of claim 2 wherein the lock washer and thrust washer are engaged as a sub assembly.

5. The assembly of claim 3 further comprising:
the outer retaining feature comprising a flat outer edge.

6. The assembly of claim 2, comprising:
the spindle shoulder having a spindle retaining feature comprising a flat spindle surface;
the outer retaining feature comprising a flat outer edge, and a flat inner edge engaging the flat spindle surface;
the nut retaining feature comprising an outer groove; and
the washer extension comprising a tab engaging the thrust washer, and
the nut extension comprising a tang engaging the outer groove of the nut body.

7. The assembly of claim 2 wherein:
the at least one washer extension comprises at least one washer tab corresponding to and bent into engagement with each outer retaining feature, and
the at least one nut extension comprises at least one nut tang corresponding to and snapping into engagement with each nut retaining feature.

8. The assembly of claim 7 further comprising:
at least one additional washer tab suitable to engage portions of the thrust washer adjacent the outer retaining feature.

9. The assembly of claim 7 wherein:
each nut retaining feature comprises an outer groove; and
each nut tang is received in the outer groove.

10. The assembly of claim 7 wherein each nut retaining feature and nut tang are configured to fit within a standard installation socket with the nut tang engaged within the nut retaining feature.

11. The assembly of claim 2 wherein the lock washer and nut are sufficiently engaged to be provided as a sub-assembly.

12. The assembly of claim 2 further comprising:
the spindle shoulder having at least one spindle retaining feature; and
the thrust washer having at least one inner retaining feature corresponding to and mating with each spindle retaining feature.

13. The assembly of claim 12 wherein the spindle retaining feature is a flat spindle surface and the inner retaining feature is a flat inner retaining feature.

14. The assembly of claim 13 wherein the inner retaining feature of the thrust washer is a keyway shape and the spindle retaining feature is a shape corresponding to and mating with the keyway shape of the thrust washer.

15. The assembly of claim 13 in which the spindle retaining feature includes longitudinal splines and the thrust washer includes teeth corresponding to and mating with the longitudinal splines of the spindle.

* * * * *

UNITED STATES PATENT AND TRADEMARK OFFICE
CERTIFICATE OF CORRECTION

PATENT NO. : 6,976,816 B2  Page 1 of 1
DATED : December 20, 2005
INVENTOR(S) : Steve Slesinski et al.

It is certified that error appears in the above-identified patent and that said Letters Patent is hereby corrected as shown below:

Column 5,
Line 42, replace "3" with -- 2 --.

Column 6,
Line 27, replace "2" with -- 10 --.

Signed and Sealed this

Fourth Day of April, 2006

JON W. DUDAS
*Director of the United States Patent and Trademark Office*